United States Patent
Soares et al.

(10) Patent No.: US 12,273,060 B2
(45) Date of Patent: Apr. 8, 2025

(54) STARTING METHODS FOR BLDC MOTORS APPLIED ON RECIPROCATING COMPRESSORS

(71) Applicant: NIDEC GLOBAL APPLIANCE BRASIL LTDA., Joinville-SC (BR)

(72) Inventors: Claudio Eduardo Soares, Joinville-SC (BR); Roberto Andrich, Joinville-SC (BR); Andre Dering, Joinville-SC (BR)

(73) Assignee: NIDEC GLOBAL APPLIANCE BRASIL LTDA., Joinville-SC (BR)

( * ) Notice: Subject to any disclaimer, the term of this patent is extended or adjusted under 35 U.S.C. 154(b) by 138 days.

(21) Appl. No.: 18/254,143

(22) PCT Filed: Nov. 22, 2021

(86) PCT No.: PCT/BR2021/050509
§ 371 (c)(1),
(2) Date: May 23, 2023

(87) PCT Pub. No.: WO2022/109699
PCT Pub. Date: Jun. 2, 2022

(65) Prior Publication Data
US 2024/0039450 A1    Feb. 1, 2024

(30) Foreign Application Priority Data
Nov. 24, 2020  (BR) .................. 10 2020 023991 0

(51) Int. Cl.
*H02K 3/28*    (2006.01)
*H02P 1/10*    (2006.01)
(Continued)

(52) U.S. Cl.
CPC .............. *H02P 29/027* (2013.01); *H02P 1/10* (2013.01); *H02P 29/032* (2016.02)

(58) Field of Classification Search
CPC ........ H02P 29/027; H02P 1/10; H02P 29/032; H02P 1/04; H02P 1/46; H02P 6/15;
(Continued)

(56) References Cited

U.S. PATENT DOCUMENTS

| 7,049,786 | B1 * | 5/2006 | Toliyat | H02P 3/18 |
| | | | | 318/400.06 |
| 2011/0234134 | A1 * | 9/2011 | Ramu | H02P 7/281 |
| | | | | 318/400.27 |

(Continued)

OTHER PUBLICATIONS

International Search Report dated Mar. 2, 2022 issued in International Application No. PCT/BR2021/050509, 3 pages.

*Primary Examiner* — Muhammad S Islam
(74) *Attorney, Agent, or Firm* — FOLEY & LARDNER LLP (57) ABSTRACT

The present invention refers to a starting method with two-levels modified and discrete fixed-time or fixed-frequency hysteresis current controller, under high load conditions, of a BLDC motor (10) with trapezoidal-shaped induced voltages, wherein the BLDC motor (10) is driven by an inverter bridge (30) with only one current sensor (20) positioned in the busbar, controlled by means of a processing unit associated to an analog-digital converter, wherein the novelty basically comprises the fact that:
the intensity of the BLDC motor current (Im) is controlled by means of the two-levels and discrete fixed-time or fixed-frequency hysteresis current controller.

17 Claims, 9 Drawing Sheets

(51) Int. Cl.
  *H02P 29/024* (2016.01)
  *H02P 29/032* (2016.01)
(58) Field of Classification Search
  CPC .... H02P 29/02; H02P 6/20; H02P 6/18; H02P 6/185
  See application file for complete search history.

(56) References Cited

U.S. PATENT DOCUMENTS

| | | | |
|---|---|---|---|
| 2014/0265964 A1* | 9/2014 | Yersin | H02P 6/182 318/400.26 |
| 2016/0134220 A1* | 5/2016 | Mandelj | H02K 3/28 318/400.27 |
| 2018/0152120 A1 | 5/2018 | Yabuguch | |
| 2018/0175752 A1 | 6/2018 | Takeoka et al. | |

* cited by examiner

FIG. 1

(PRIOR ART)

(PRIOR ART)

STARTING METHODS FOR BLDC MOTORS APPLIED ON RECIPROCATING COMPRESSORS

CROSS-REFERENCE TO RELATED APPLICATIONS

This application is a national stage entry of PCT Application No. PCT/BR2021/050509, filed on Nov. 22, 2021, which claims priority to Brazilian Application No. 10 2020 023991 0, filed on Nov. 24, 2020, the contents of all of which are incorporated herein by reference in their entireties.

TECHNICAL FIELD

The present invention refers to reciprocating compressors comprising a brushless direct current three-phase motor (BLDC), having voltages induced in a trapezoidal shape.

More specifically, the present invention refers to a starting method for a BLDC motor without a mechanical position sensor, under conditions of high load and non-equalized pressure, typical of refrigerating systems that have blocking valves for improving the efficiency.

The methods according to the present invention are conducted by means of driving a BLDC motor through a triphasic inverter bridge, having only one current sensor positioned on the busbar, controlled by means of a processing unit associated to an analog-digital (A/D) converter.

BACKGROUND OF THE INVENTION

The motors commonly used for driving variable capacity reciprocating compressors are the brushless direct current motors—BLDC, due to its high-power density and high efficiency, besides the simplicity of its driving and the reduced number of components required for conducting such driving, which makes the cost of the refrigerating system cheaper.

Figure 1:
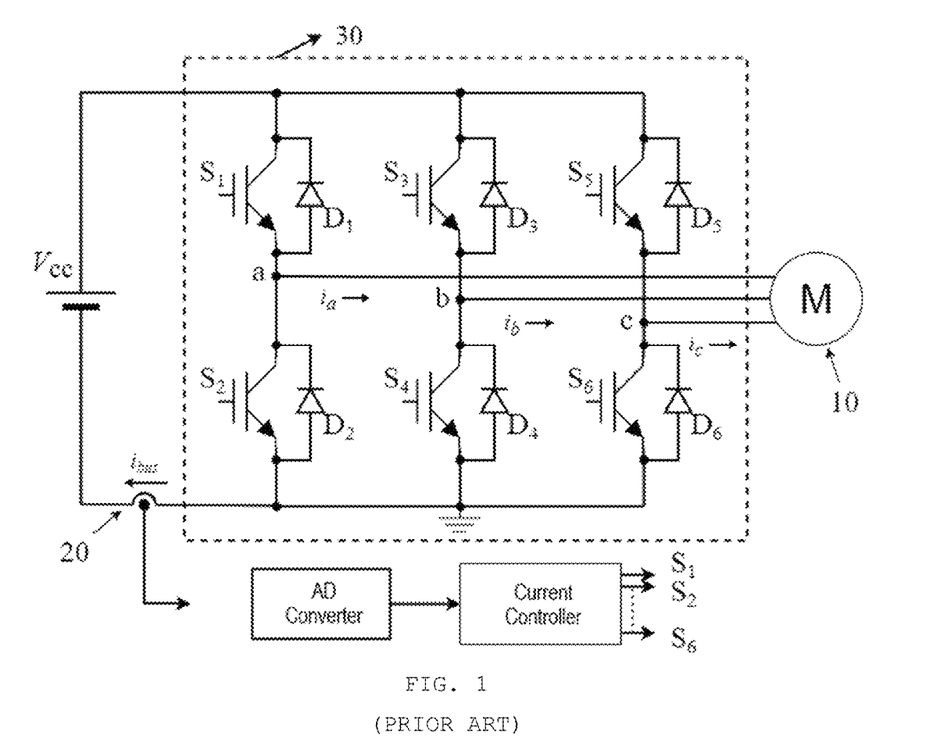
FIG. 1 depicts an electronic circuit and a BLDC motor associated to said electronic circuit of the prior art.

FIG. 1 depicts a system used for driving variable capacity reciprocating compressors in the state of art. As it can be noted in FIG. 1, said system comprises a direct electric power supply $V_{cc}$, a current sensor 20 in the busbar, said sensor measuring the busbar current $i_{busbar}$, an analogic-digital converter and a current controller. The current controller being associated to six switches $S_1$-$S_6$, said switches being responsible for the intensity of the current applied to the BLDC motor 10. Moreover, the switches $S_1$-$S_6$ are associate in parallel to six freewheel diodes $D_1$-$D_6$. The switches $S_1$,S2 and the freewheel diodes $D_1$,$D_2$ are associated to phase A of the BLDC motor 10 and are responsible for the intensity of the current ia, the switches $S_3$,$S_4$ and the freewheel diodes $D_3$,$D_4$ are associated to phase B of the BLDC motor 10 and are responsible for the intensity of the current $i_b$, and the switches S5,S6 and the freewheel diodes $D_5$,$D_6$ are associated to phase C of the BLDC motor 10 and are responsible for the intensity of the current $i_c$. In addition, the six actuating switches $S_1$-$S_6$ and the six freewheel diodes $D_1$-$D_6$ compose an inverter bridge (30).

Figure 2:
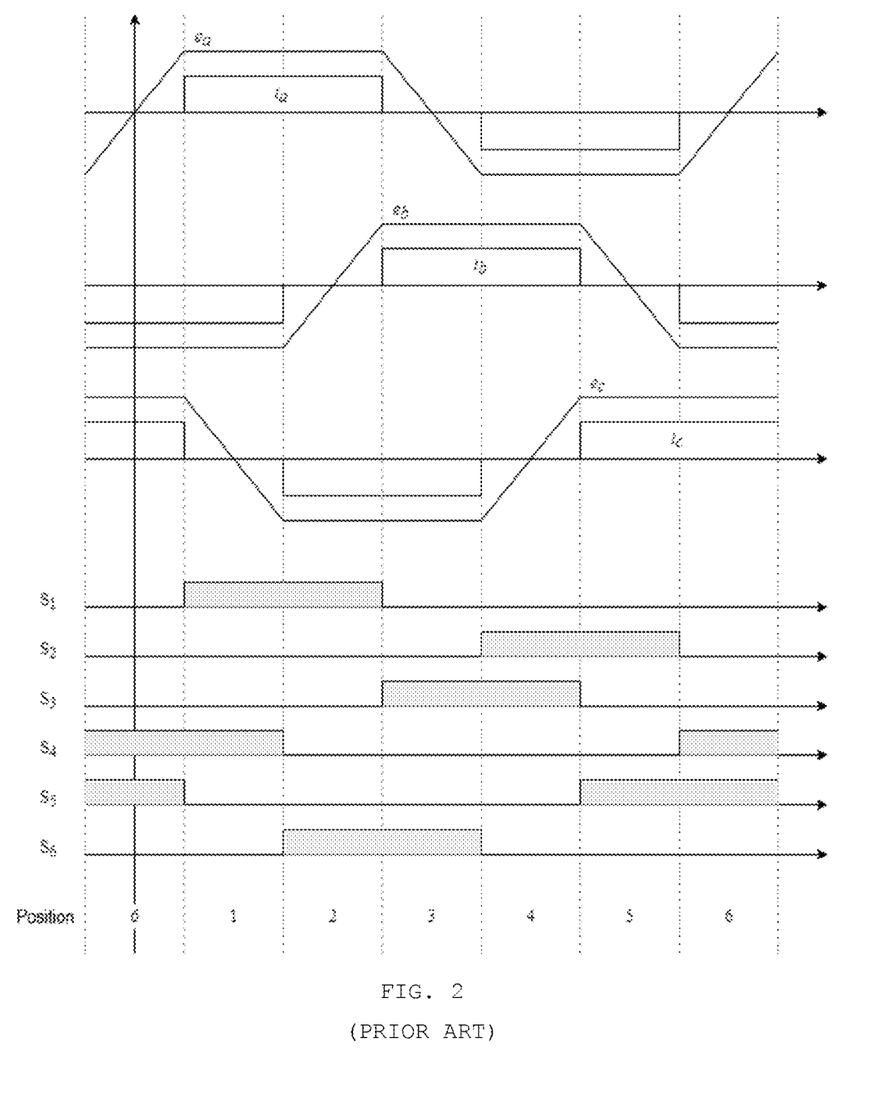
FIG. 2 depicts the induced voltage waveforms, of the desired current and the command signs of the six-step driving method of a BLDC motor of the prior art.

In addition, FIG. 2 depicts, on the upper half, the induced voltage waveforms $e_a$, $e_b$, $e_c$ and the desired currents $i_a$, $i_b$, $i_c$ on the BLDC motor 10, and, on the lower half, the waveforms of the command signs applied to the switches $S_1$-$S_6$ in a typical driving of the BLDC motor 10.

The basic principle of running a three-phase BLDC motor consists of driving only two phases of the motor in each step of the driving of said motor, whereas the third phase is left open. The beginning and the end of the driving of each phase must be coincident with the flat regions of the induced voltage waveforms, in order to provide a continuous torque to said BLDC motor. Therefore, the driving of a three-phase BLDC motor can be divided in six steps divided in six discrete electrical positions, each position having 60° electrical degrees, inside an electrical cycle of 360° electrical degrees, and, as such, it is called a six-step drive as it can be noted in FIG. 2. In addition, an important characteristic of the six-step drive consists of the fact that when passing certain electrical position into the next electrical position, the phase that was open becomes driven, one of the two phases that were being actuated is open, while the other remains being actuated.

The six-step drive of a three-phase BLDC motor is generally conducted by means of a three-phase inverter bridge that is responsible for the electronic switching of the BLDC motor switches, according to the basic principle of driving described above, and by the intensity of the voltage applied to the motor. The driving of the motor phases is conducted by means of driving only two switches by electrical position, one switch on the upper branch and the other one on the lower branch of the inverter bridge, each switch operating by 120° electrical degrees. Additionally, the intensity of the voltage applied to the BLDC motor can be controlled by means of the pulse width modulation—PWM on one or both switches actuated in each electric position.

In addition, as only two phases of the BLDC motor are actuated in each driving step, it is common, in low-cost applications, that the monitoring of the motor current is conducted indirectly by means of only one current sensor located in the busbar. However, such configuration implies in a series of restrictions that need to be addressed and will be described further below.

The simpler way for controlling a BLDC motor is by means of controlling the voltage applied to the motor based on the error between the desired speed and the real speed. The simpler starting of a BLDC motor consists of applying an open-mesh voltage ramp, with the increase of the voltage and reduction the time in each electric position, up to a minimum speed, where a closed-mesh drive can be conducted by means of the voltage controller.

However, a problem of such controlling type consists of a slow answer, such answer does not allow a fast control of the BLDC motor torque, such as required in some applications, as for example, the starting of reciprocating compressors having non equalized pressures, a typical requirement of refrigerating systems having block valves.

With the aim of providing a faster answer, a solution known in the state of art consists of controlling the torque applied to the BLDC motor by means of a current controller that controls the current circulated in the motor. Such type of controller contains multiple control meshes, an external mesh for controlling the speed and an inner mesh for controlling the torque via the current control.

The hysteresis current controllers are very popular due to its application simplicity, ability of a fast dynamic answer to the transient and ability inherent of limiting the maximum current. Another characteristic of the hysteresis current controllers consists of its sturdiness, as such type of controller does not depend on the motor parameters.

Moreover, in the conventional hysteresis current controllers, the real current is controlled so that it is within a narrow operating range, near a desired current. Thus, the action of the current control is turned off whenever the real current surpasses the upper limit of such operating range, and it is turned on again when the real current surpasses the lower limit of the operating range.

In the conventional hysteresis current controllers for BLDC motors, three current sensors are used, one for each phase of the motor. The phase currents of the BLDC motor are compared with the reference currents using three independent comparators.

An alternative consists of using only one current sensor in the busbar, as ideally only two motor phases are actuated at each actuating step. However, using only one current sensor in the busbar shows some limitations, mainly regarding the switching method used.

Figure 3A:
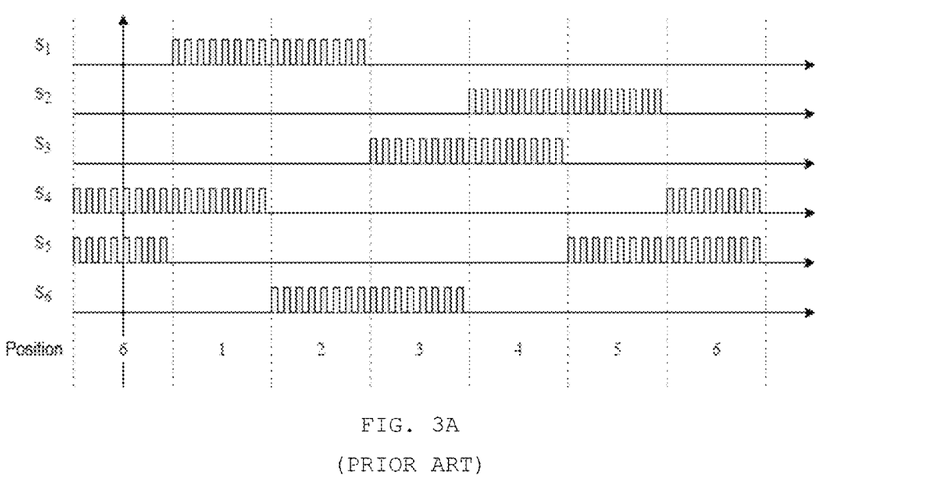
FIGS. 3A and 3B depict the difference between the switching types: (A) bipolar and (b) unipolar for driving a BLDC motor of the prior art.

The switching method commonly used together with the hysteresis current controllers is the bipolar switching method, depicted in FIG. 3A. In the bipolar switching method, the pulse width modulation is applied to two switches that are actuated on a certain electrical position. The bipolar switching methods is simpler and can offer a better transitory answer, once it can apply $+V_{cc}$ and $-V_{cc}$ in the phases corresponding to the two switches that are being actuated. However, the current undulation, the switching frequency and the switching losses are bigger when compared to the unipolar switching methods.

Figure 3B:
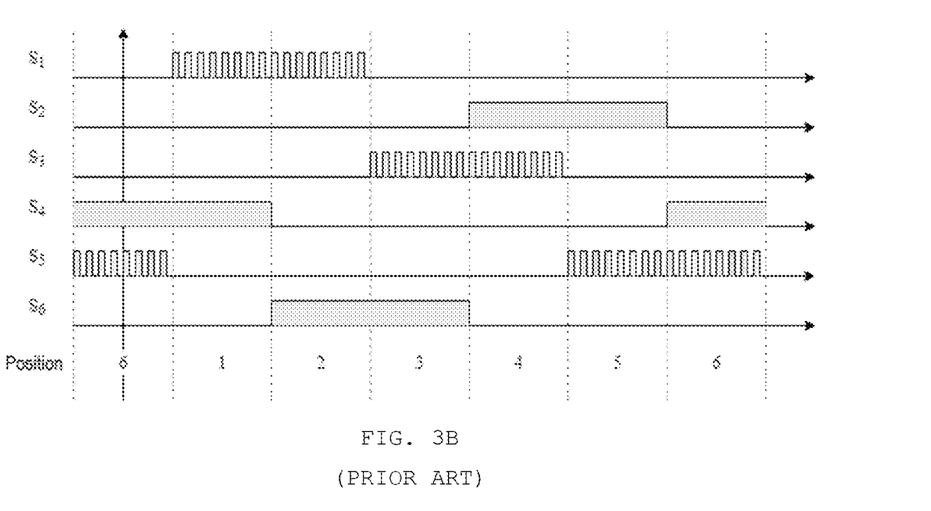

In the unipolar switching method, the pulse width modulation is only applied at one of two phases actuated in certain electric position, while the other one is kept continuously turned on, such as depicted in FIG. 3B. Thus, in the unipolar switching method there is less switching loss, since the pulse width modulation is only applied to the switches of one of the two actuated phases, the current undulation is reduced in half, since the voltage applied to the phase is 0 and $+V_{cc}$ or 0 and $-V_{cc}$, and the switching frequency is also reduced, due to the reduction in the voltage amplitude applied to the motor.

The unipolar switching method can also be divided in several switching patterns. The differences between the patterns of the unipolar method can consist of the restrictions associated to the driving circuits of the switches, the possibility of current return by the busbar of the interrupted phase when changing an electrical position, and the input when conducting the open phase via the freewheel diodes (Y.-s. Lai and Y.-k. Lin, "Assessment of Pulse-Width Modulation Techniques for Brushless DC Motor Drives," in Conference Record of the 2006 IEEE Industry Applications Conference Forty-First IAS Annual Meeting, 2006, doi: 10.1109/ias.2006.256754.).

Among such unipolar switching patterns, two are widely known and used: the PWM_ON and ON_PWM patterns.

Figure 4A:
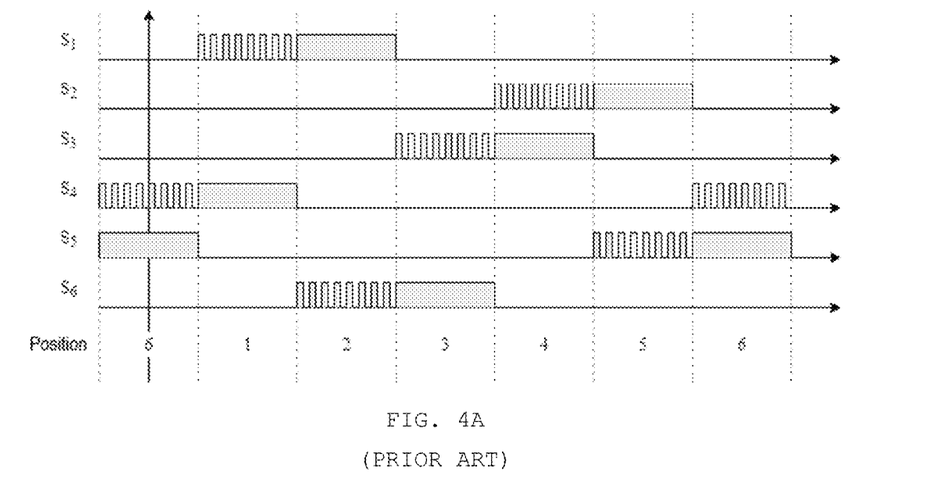
FIG. 4A depicts the PWM_ON pattern being applied on switches of the prior art.

In the PWM_ON pattern, represented in an exemplifying way in FIG. 4A, the pulse width modulation is applied during the initial 60° electrical of its operation and later the switch is kept switched on (ON) during the final 60° electrical. The PWM_ON pattern prevents the freewheel current of the interrupted phase of returning by the busbar even during the opening of one of the switches.

Figure 4B:
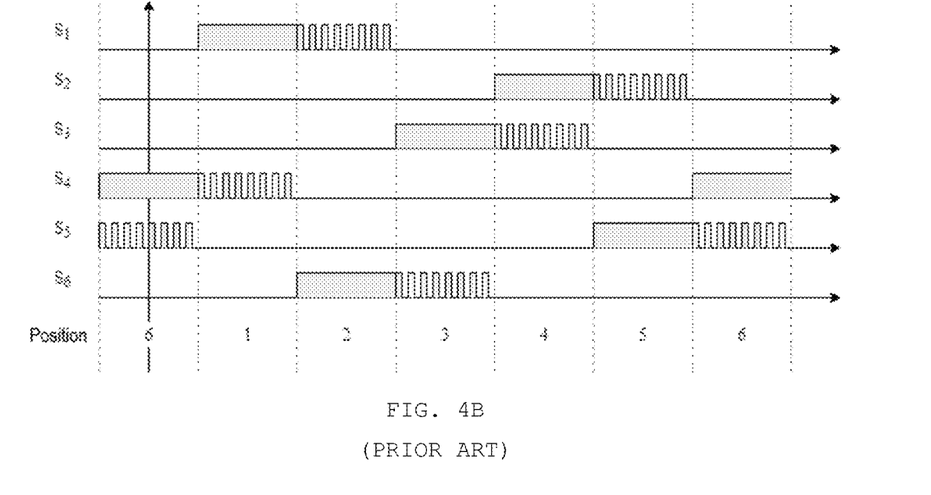
FIG. 4B depicts the ON_PWM pattern being applied on switches of the prior art.

Yet in the ON_PWM pattern, represented in an exemplifying way in FIG. 4B, the sequence is inverted, the switch is kept switched on (ON) during the initial 60° electrical of its operation and later the pulse width modulation is applied during the final 60° electrical. The ON_PWM pattern forces the return of freewheel current of interrupted phase by the busbar during the opening of the switches.

Figure 5:
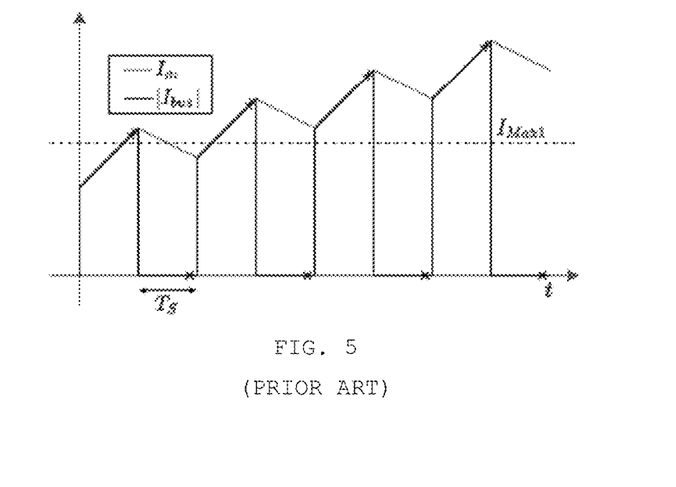
FIG. 5 depicts the sampling impact on the discrete hysteresis controllers associated to the unipolar switching of prior art.

In spite of the advantages highlighted for the unipolar switching methods, there is a very important restriction when associating such unipolar methods to the hysteresis current controllers with only one current sensor on the busbar. Such restriction happens because, during the opening of only one switch, the motor current stops circulating by the busbar, preventing the correct comparison of the motor current with the limits of the controller current of conventional hysteresis current. Thus, the recovery of the switch driving could be anticipated, and the resulting current could increase cycle after cycle, such as shown in FIG. 5.

The prior art shows some alternatives to the conventional hysteresis current controllers, such alternatives allow to overcome some of the restrictions presented up to now, such as the limitation of using the unipolar switching methods with hysteresis current controllers with only one current sensor in the busbar.

In this sense, the document by Jahns (T. M. Jahns, R. C. Becerra, and M. Ehsani, "Integrated current regulation for a brushless ECM drive," *IEEE Transactions on Power Electronics*, vol. 6, no. 1, pp. 118-126, January 1991, doi: 10.1109/63.65010.), published in January 1991, proposes a strategy for regulating the current for BLDC motors using current sensors integrated to the switches as an alternative to using an only current sensor in the busbar.

Based on this topology, Jahns proposes the current control of the motor by means of applying an analogic fixed-time hysteresis current controller, using only the current sensors associated to the lower switches and conducting the opening of only one of such switches. The choice of a fixed-time hysteresis current controller, instead of waiting for the current to drop up to a lower protecting current limit, such as in the conventional controlling techniques of hysteresis current control, is due to the fact the integrated current sensor is in series with the switch, being unable to measure the current circulating by the diode when the switch is open.

In addition, Jahns proposes using the current sensors integrated with the upper switches as a rear protection against overcurrent, but with a current protection limit fixed and adjusted above the maximum limit of current used in regulation of the motor current. Thus, such current protection would only act under abnormal operating conditions, in order to guarantee the integrity of the motor and the electronics of the system.

The disadvantages of the method proposed by Jahns would be the need of current sensors integrated to all the switches and the need of a current controller for each switch, increasing the cost and decreasing the reliability of the solution.

The document by Becerra (R. C. Becerra, T. M. Jahns, and M. Ehsani, "Four-quadrant sensorless brushless ECM drive," in [Proceedings] APEC 91: Sixth Annual Applied Power Electronics Conference and Exhibition, 1991, doi: 10.1109/apec.1991.146165), published in 1991, proposes a driving for BLDC motors without rotor position sensor and able of operating on four quadrants. The control and drive strategy proposed by Becerra is very similar to the proposal by Jahns, with some small variations.

As an alternative to the analogic fixed-time hysteresis current controller, proposed by Jahns, Becerra proposes an analogic fixed-frequency hysteresis current controller. The restrictions for such Becerra's consideration are the same present in Jahns, that is, the loss of ability of measuring the current when the switch is open. The benefit of applying a fixed frequency modulation would be the simplification of the EMC filters (Electromagnetic Compatibility) associated to the inverter input circuit.

Becerra also proposes a pulse width modulation pattern different than Jahns for current control, such pattern being the ON_PWM previously described, that forces the return of the freewheel current of the interrupted phase by the busbar during the opening of one of the switches. As such, it is possible to extinguish faster the freewheel current of the phase that is open and preserve the indirect sensing of electrical position by means of monitoring the voltages induced in this open phase.

In spite of the improvements introduced by Becerra, the disadvantages carry on being the need of current sensors integrated with all the switches and the need of a current controller for each switch, increasing the cost and reducing the reliability in the solution.

The document by Wei (Wei, Y.; Xu, Y.; Zou, J. & Li, Y. Current Limit Strategy for BLDC Motor Drive With Minimized DC-Link Capacitor IEEE Transactions on Industry Applications, Institute of Electrical and Electronics Engineers (IEEE), 2015, 51, 3907-3913), published in 2015, proposes a strategy for limiting the current with only one current sensor in the busbar for driving BLDC motors constituted by low capacitance capacitors in the busbar. The objective of the proposed strategy consists of preventing the excessive voltage increase in the busbar caused by the return of the freewheel current of the motor on the capacitors. For this, Wei uses a fixed-time hysteresis current controller associated to the pulse width modulation of the PWM_ON type.

However, Wei was never worried about the limitations of the solution proposed in the starting or in the case of a starting failure, where the motor low speed or even the reversion of the rotating sense can cause the current control not be effective and the current ends up increasing above the desired limit, in spite of using a fixed-time hysteresis current controller, though discrete, such as proposed by Wei. Such limitations and the consequent overcurrent in these conditions shall be explained as follows.

Figure 6:
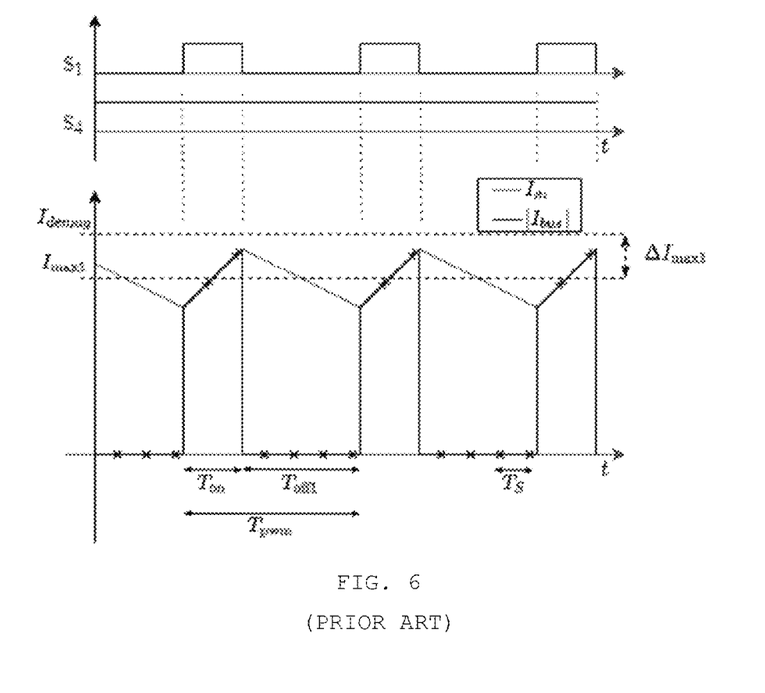
FIG. 6 depicts the command signs of a fixed-time hysteresis current controller of the prior art.

FIG. 6 depicts a starting method, according to the state of art, with a one-level discrete fixed-time hysteresis current controller, wherein when applying a current to generate a maximum torque in the BLDC motor 10 during start, the voltage applied to the BLDC motor 10 is turned off, by means of opening the switch $S_1$, when the BLDC motor current $I_m$, measured at a measuring instant X, after each sampling period $T_s$, overcomes the first maximum current limit $I_{max1}$ allowed and it is reestablished, after a first protecting time $T_{off1}$, with the closing of the switch $S_1$.

The intensity of the current applied to the BLDC motor 10 must be the largest possible during the start, that is, it must be a current applied of maximum intensity, to generate the maximum of torque on the BLDC motor 10. However, the current applied must be less than a maximum current allowed $I_{desmag}$ for the healthy operation of said BLDC motor 10, that is, a current that does not cause damage to the magnets of the BLDC motor 10.

FIG. 6 also depicts a starting method with a one-level discrete fixed-frequency hysteresis current controller of the prior art. In this case, the voltage applied to the motor is switched off, by means of opening the switch $S_1$, when the current of the BLDC motor $I_m$, measured at a measuring instant X after each sampling period $T_s$, overcomes the first maximum current limit $I_{max1}$ allowed, and it is only reestablished, by closing the switch $S_1$, on the next pulse width modulation period $T_{PWM}$.

It is worth highlight the recovery of the switch driving, due to surpassing the first maximum current limit $I_{max1}$, after a first protecting time $T_{off1}$, instead of a minimum current vale, is required because when only one of the switches is open, in the example of FIG. 6 the switch $S_1$, the BLDC motor current $I_m$ does not circulate by the current sensor 20 of the busbar, preventing its measurement. Alternatively, the start recovery can also be conducted in the next pulse width modulation period $T_{pwm}$.

Figure 7A:
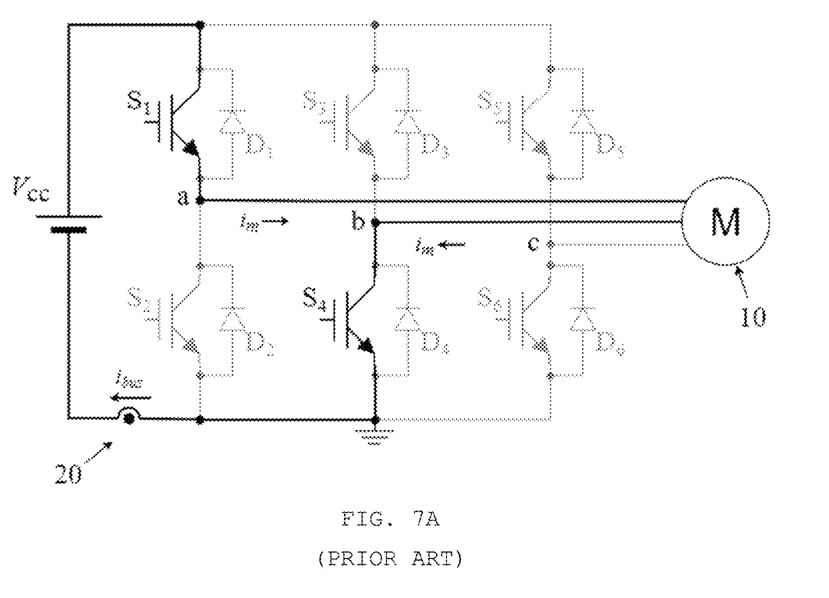
FIGS. 7A, 7B and 7C depict the relationships between the phase currents of the motor and the busbar current when only two phases are conducting of the prior art.
Figure 7B:
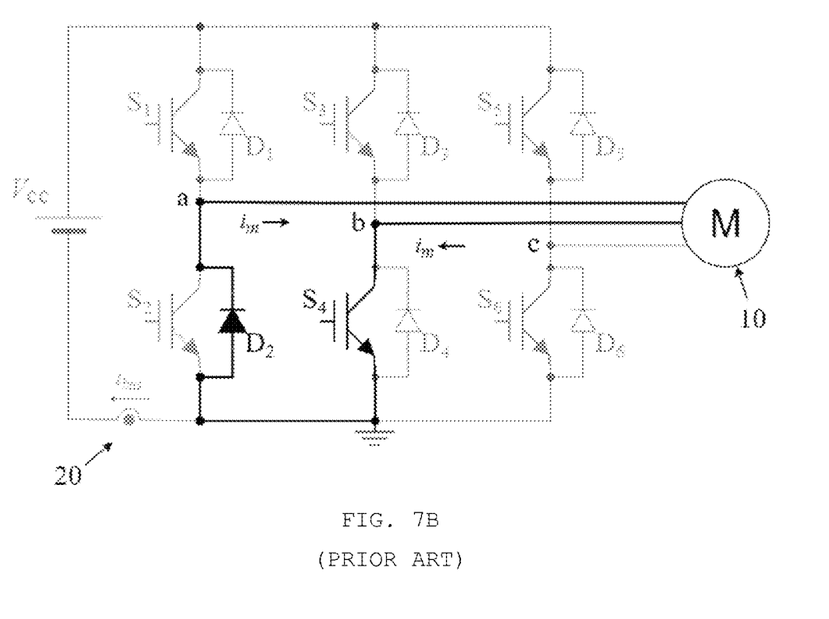

As it can be noted in FIG. 7A, which represents an exemplifying reference electrical position for analyzing the reading of the BLDC motor current 10, when the BLDC motor 10 is being driven, the busbar current $i_{busbar}$ is equal to the current circulating in the phases of the BLDC motor 10. However, as can be noted in FIG. 7B, in a subsequent moment of the same electric position, by opening only the switch $S_1$ when the current surpasses the first maximum current limit, it is not possible to measure the BLDC motor current $I_m$ by means of the current sensor 20 in the busbar, since the busbar current $i_{busbar}$ is null during such step.

As already previously mentioned, the advantage of opening only one switch consists of lower instantaneous torque variation of BLDC motor 10, lower switching frequency and lower commutation loss.

However, in very low revolutions, such as in the beginning of the start or in the case of a failure in the start, the opening of only one switch $S_1$, followed by its closure after a first protecting time $T_{off1}$ or on the next pulse width modulation period $T_{PWM}$, may not be sufficient to prevent an overcurrent on the BLDC motor 10, as it can be noted in FIG. 5.

The overcurrent happens because, in the case of the discrete current controller, the minimum time the switch remains turned on is limited by the sampling time $T_s$ of the current of the analog-digital converter (A/D). Thus, the anticipated recovery of the driving, associated to the minimum time the switch remains turned on due to the discrete control characteristics, can lead to a gradual increase of the current limit, such as shown in FIG. 5.

Figure 8:
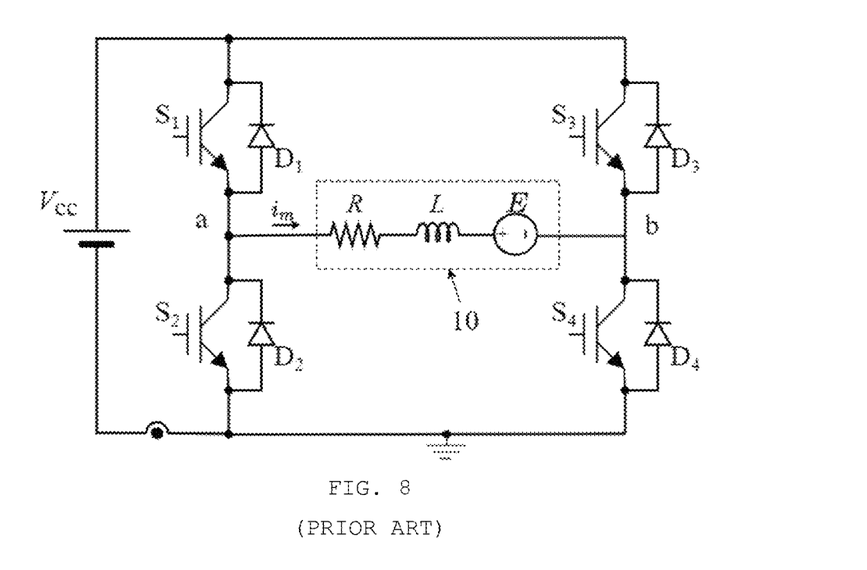
FIG. 8 depicts a model equivalent of the BLDC motor during the driving of phases A and B of the prior art.

FIG. 8 depicts an equivalent model of a BLDC motor 10 during the driving of the phases A and B of the prior art, wherein "L" is the equivalent inductance of phases A and B and "R" the equivalent resistance of the phases A and B, and "E" is the equivalent induced voltage between phases A and B.

Additionally, FIG. 6 depicts the driving of a BLDC motor 10 of the prior art with a one level discrete fixed-time or fixed-frequency hysteresis current controller, wherein a first step consists of switches $S_1$ and $S_4$ being closed during a first time period $T_{on}$, and a second step consists of opening the switch $S_1$ during the first protecting time $T_{off1}$, the period of pulse width modulation $T_{pwm}$ comprising first and second steps.

The currents in the first and second steps can be modelled as:

$$i_1(t) = \frac{V_{CC} - E}{R}\left(1 - e^{-\frac{t}{\tau}}\right) + I_1 e^{-\frac{t}{\tau}}$$

$$i_2(t) = \frac{-E}{R}\left(1 - e^{-\frac{t}{\tau}}\right) + I_2 e^{-\frac{t}{\tau}}$$

wherein $i_1(t)$ is the current during the first step, $I_1$ is the initial current in the first step, $i_2(t)$ is the current during the second step, $I_2$ is the initial current in the second step and $\tau$ the electric time constant wherein:

$$\tau = \frac{L}{R}$$

For practical purposes, the pulse width modulation period $T_{pwm}$ is much less than the electric time constant $\tau$, and therefore, we can approach the behavior of the currents $i_1(t)$ and $i_2(t)$ as first order linear equations, the inclination being set by its derivates in the initial instant:

$$\alpha_1 = \frac{di_1(t)}{dt}\Big|_{t=0} = \frac{V_{CC} - E}{R} - \frac{I_1 R}{L}$$

$$\alpha_2 = \frac{di_2(t)}{dt}\Big|_{t=0} = -\frac{E}{L} - \frac{I_2 R}{L}$$

wherein $\alpha_1$ is the current inclination in the first step and $\alpha_2$ is the current inclination in the second step.

Thus, the current variation both in the first and second steps can be approached by:

$$\Delta i_1 = \alpha_1 \cdot T_{On} = \left(\frac{V_{CC} - E}{L} - \frac{I_1 R}{L}\right) \cdot T_{On}$$

$$\Delta i_2 = \alpha_2 \cdot T_{off1} = \left(-\frac{E}{L} - \frac{I_2 R}{L}\right) \cdot T_{off1}$$

where $\Delta i1$ is the current variation in the first step and $\Delta i2$ is the current variation in the second step.

Thus, in case of very low revolutions, such as in the beginning of the start or in case of a start failure, if we take into account the induced voltage E of the BLDC motor 10 very low or practically null, and the busbar voltage $V_{cc}$ much higher than the voltage drop in resistances R due to current $I_1$ circulating in the BLDC motor 10, the variation increment of the current in the first step $\Delta i_i$ can be higher than the variation decrement of the current in the second step $\Delta i_2$, even if the time $T_{on}$ is lower than the protecting time $T_{off1}$.

There are other types of current controllers developed for controlling the current. Among such other topologies, we can highlight the predictive controllers and the deadbeat controllers. However, such types of controllers depend on the motor parameters and on its speed. The speed dependence is a concern, specially at the start of compressors due to the initial acceleration requisites. The speed dependence is also a concern for the reciprocating compressors due to the speed oscillation caused by the load profile.

Additionally, there are several other solutions developed for improving the performance of such classical solution.

For example, the North American patent document U.S. Pat. No. 5,019,756, entitled: "PROCESS AND ELECTRONIC CIRCUIT FOR CONTROLLING A BRUSHLESS DIRECT CURRENT MOTOR", published on 28 May 1991, describes a control system for a BLDC motor during the start stage. Such document describes that the start is conducted in three steps:
1) a first two-switch combination is applied to inject current in two phases of the motor and bring the rotor to an electrical position known for a certain time;
2) two open mesh steps are applied and then await a certain time, checking if the induced voltage on the motor coils is detectable; and
3) when the induced voltage is detected by means of an analog position sensor, it enters in a self-controlled step.

The document U.S. Pat. No. 5,857,349, entitled: "REFRIGERATING APPARATUS, AND REFRIGERATOR CONTROL AND BRUSHLESS MOTOR STARTER USED IN SAME" published on 12 Jan. 1999, describes a three-pattern set (A, B, C) of commuting sequences to be applied during the start of the motor. Each pattern is a sequence of nine open mesh commutations with different timings, such timings depending on the level of existing load. The pattern A was prepared for lighter load conditions and pattern C for heavier loads. The start always begins by pattern A and it is successively altered for the following pattern in case of failure.

The document JP200328073, entitled: "EXPOSURE METHOD AND ALIGNER", published on 26 Aug. 2004, shows a start proposal by means of speed and current control. However, the proposal shown on JP200328073 does not clearly set the type of current controller and neither takes into account all the restrictions presented in this document.

The document US2018/152120, entitled: "ELECTRIC WORKING MACHINE AND METHOD FOR CONTROLLING ELECTRIC WORKING MACHINE", published on May 31, 2018, discloses an electric working machine that includes a motor, a first switching element, a second switching element, a rectifier element, and a controller. The controller is configured to perform a stop control, in which completion of a first current path is maintained via the first switching element for a specified time period and a second current path is interrupted via the second switching element, in response to satisfaction of a stop condition for stopping power supply from a power source to the motor during rotation of the motor.

It is important to highlight that the torque generated in a BLDC motor is proportional to the current applied on it, as well as the magnetic flow generated by its permanent magnets. Therefore, in case it is desired to obtain a maximum torque during the start of the motor, it is only required to increase to maximum the current value applied on it, taking into account that such current is applied in synchronism with the induced voltages in the motor.

A problem in the prior art is the fact that the starting methods are based on adjusting the voltage applied to the motor, based on the speed of the motor. In addition, the prior art starting methods tend not to have a good dynamic answer when subject to a high load, since they are not able to generate the maximum torque of the motor.

Another problem of the prior art arises when applying a maximum intensity current in a BLDC motor, to generate the maximum torque on said BLDC motor in low-cost systems having only one current sensor in the busbar, with no adequate control of the level of such current, which can cause damage to the BLDC motor, especially when a start failure occurs.

SUMMARY

An objective of the present invention consists of providing a starting method that prevents the drawbacks of the prior art.

Such object is reached by means of a starting method with two-levels discrete fixed-time or fixed frequency hysteresis current controller, under high load conditions, of a BLDC motor with trapezoidal shaped induced voltages, the BLDC motor being driven by an inverter bridge with only one current sensor positioned in the busbar, controlled by means of a processing unit associated to an analog-digital converter, comprising the following steps:
  driving the BLDC motor by the six-step driving technique, wherein only two phases are driven at a certain electric position;
  applying, by means of a closed mesh of current control, a current in the BLDC motor of maximum intensity in order to generate a maximum torque in said BLDC motor;
  applying the unipolar switching pattern of the ON_PWM type, wherein each switch is driven during 120° electrical in the following way: each switch is maintained switched on continuously during the first 60° electrical and is modulated by pulse width modulation during the final 60° electrical;

controlling, by means of the two-levels discrete fixed-time or fixed frequency hysteresis current controller, the intensity of the BLDC motor current, wherein the first protecting level comprises:
turning off a first switch, during a first protecting time, when the BLDC motor current, measured in a measuring instant, surpasses a first maximum current limit; and keeping the first switch turned off and turning off a second switch, during a second protecting time, in the end of the first protecting time;

and wherein the second protecting level comprises:
turning off the first switch and the second switch, during a third protecting time, when the BLDC motor current, measured in a measuring instant, surpasses a second maximum current limit.

In addition, the method according to the present invention consists of the first maximum current limit is lower than the second maximum current limit, and the second maximum current limit is lower than the maximum current allowed.

Moreover, the method according to the present invention consists of the second maximum current limit is set by subtracting the maximum current allowed by a second maximum error, and the first maximum current limit is set by subtracting the second maximum current limit by a first maximum error.

Additionally, the method according to the present invention consists of the difference between the value of the second maximum current limit and the value of the maximum current allowed is higher than the value of the increment of the second maximum error.

The method according to the present invention also consists of the difference between the value of the second maximum current limit and the value of the maximum current allowed being higher than the value of the increment of the second maximum error.

Additionally, the method according to the present invention consists of the first protecting time guarantees that the reduction of the BLDC motor current is higher than the first maximum error in the case of a successful start.

In addition, the method according to the present invention consists of the second protecting time must be lower than or equal to the sampling period.

The method according to the present invention also consists of the second protecting time is gradually extinct when the BLDC motor reaches ¼ of the nominal speed or carries out a complete mechanical turn.

In addition, the method according to the present invention consists of the gradual extinction of the second protecting time must be done in approximately one second.

Further, the method according to the present invention consists of the third protecting time guarantees that the reduction of the BLDC motor current is bigger than the increment of the second maximum error even in the case of a starting failure.

Still, the method according to the present invention consists of the third protecting time may be replaced by the following condition:
the two switches are switched on again when the motor current, measured in a measuring instant, is lower than the first maximum current limit.

The method according to the present invention also consists of the third protecting time may be replaced by the following condition:
the starting is aborted when the motor current surpasses a second maximum current limit.

Further, the method according with the present invention consists of the first protecting time may be adjusted in function of the speed of the motor.

Additionally, the method of the present invention consists of the step of turning off a first switch, during a first protecting time, when the BLDC motor current, measured in a measuring instant, surpasses a first maximum current limit is replaced by:
turning off a first switch when the BLDC motor current, measured in a measuring instant, surpasses a first maximum current limit, and only switch it on again in the beginning of the next modified period of the pulse width modulation.

Still, the method according to the present invention consists of the first switch to be turned off is the switch associated to the phase kept driven after a change of electrical position.

Further, the method according to the present invention comprises of taking advantage of the opening of both switches, in the end of the second protecting time, in order to be able to carry out the monitoring of the biggest current under circulation by the BLDC motor.

In addition, the method according to the present invention guarantees a more effective protection against possible overcurrents.

Another advantage of the method according to the present invention consists of providing a protection that is required mainly in the initial instants of driving or when a starting failure occurs, situations where the induced voltage is very low, and the action of the control applied on the first maximum current limit may not be sufficient against possible overcurrents.

In addition, another advantage of the present invention consists of the opening of the two switches at the end of the protection of the first maximum current limit prevents the current from escaping the control of the current controller through the compensation of the application of busbar voltage during a sampling period by the application of the inverse busbar voltage also during a sampling period.

Another advantage of the method according with the present invention, consists of guaranteeing the bigger current under circulation by the motor to pass momentaneous, when opening the two switches during the second protecting time, by the busbar, where the current sensor is, thus assuring the monitoring and controlling of said total current, and thus, obtaining a more effective protection of the motor.

BRIEF DESCRIPTION OF THE DRAWINGS

The objectives and advantages of the present invention will become clearer in the following detailed description of the examples and non-limiting drawings shown at the end of this document.

DETAILED DESCRIPTION

The present invention describes a starting method of a BLDC motor 10 with the aid of a two-levels discrete and modified fixed-time or fixed frequency hysteresis current controller, using only a current sensor 20 in the busbar.

As noted in FIG. 1, the current control is reached by means of a closed mesh, that associates operatively the current sensor 20 in the busbar, the A/D converter, the current controller and the BLDC motor 10, wherein the voltage applied to the BLDC motor 10 consists of the difference between the desired applied current and the real applied current.

Figure 7C:
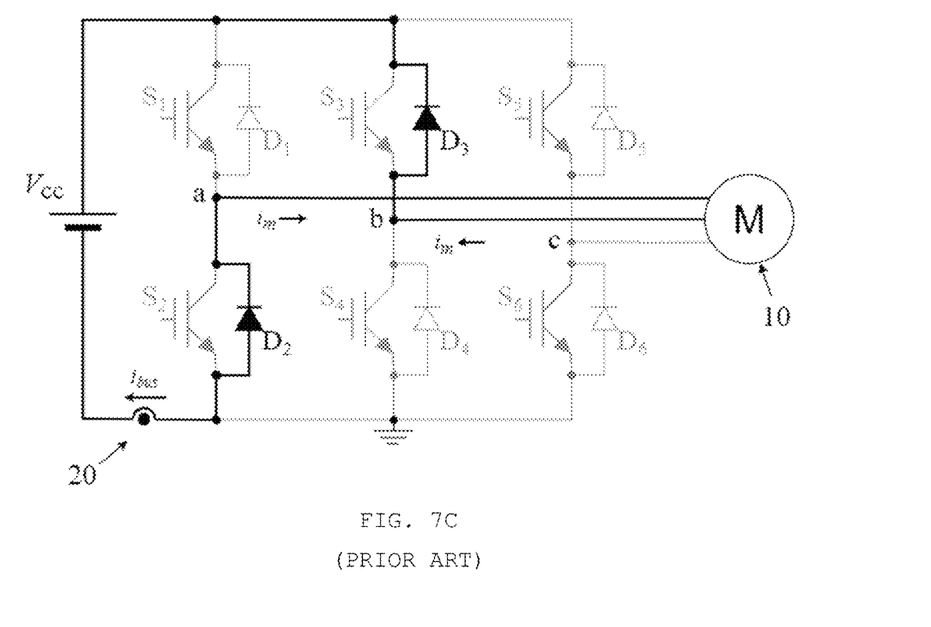
Figure 9:
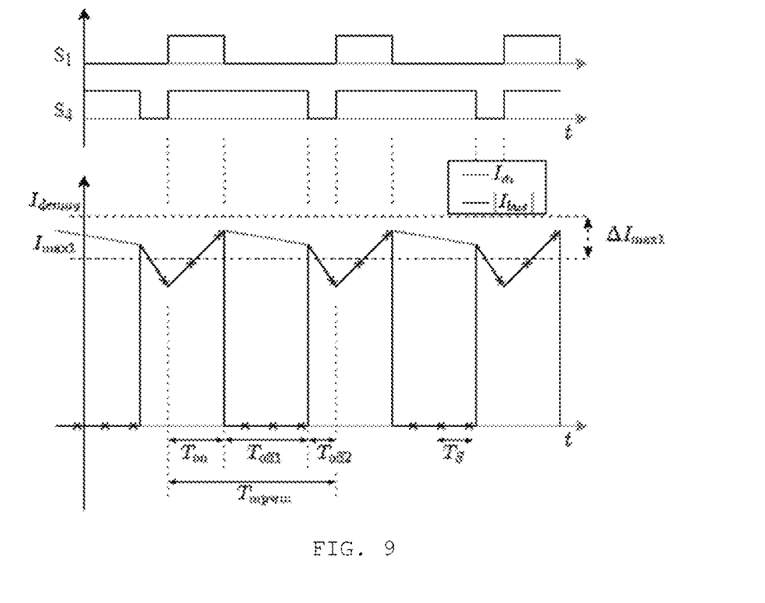
FIG. 9 depicts the command signs of a modified hysteresis current controller according to the present invention.

As shown in FIG. 9, the starting method with two-levels fixed time modified and discrete hysteresis current controller, object of the present invention, sets a third step with a second protecting time $T_{off2}$, wherein two switches are open, for example, $S_1$ and $S_4$. Thus, the of BLDC motor current $I_m$ is forced to pass in the opposite direction by the busbar, applying a negative voltage on the BLDC motor 10 and forcing a reduction of such current, such as shown in FIG. 7C.

Optionally, still according to FIG. 9, the starting method uses fixed-frequency, setting a modified period of pulse width modulation $T_{MPWM}$ comprising of first, second and third steps. During the modified period of pulse width modulation $T_{MPWM}$, both switches, for example, $S_1$ and $S_4$, are open in the end of each modified period $T_{MPWM}$ by a time $T_{off2}$. Additionally, one of the switches, for example, the switch $S_1$ can be open in a previous moment, for example, when the current surpasses the first maximum current limit $I_{max1}$ and will only be turned on again in the beginning of the next modified period $T_{MPWM}$.

The difference between the fixed-time hysteresis current controller and the fixed-frequency hysteresis current controller is the fact that in the fixed-time, $T_{off1}$ is fixed and $T_{MPWM}$ is variable, while in the fixed-frequency, $T_{MPWM}$ is fixed and $T_{off1}$ is variable. In both cases, the time $T_{on}$ is variable and depends on the operating condition and the time $T_{off2}$ is fixed.

The current equation during the third step, (equation i3(t)); the approximating equation (equation α3) of this current by a straight line with the inclination defined by the derivative of the current i3(t) in the initial instant (t=0); and the current variation equation in the third step (equation Δi3) are defined as below:

$$i_3(t) = \frac{-V_{CC}-E}{R}\left(1-e^{-\frac{t}{\tau}}\right)+I_3 e^{-\frac{t}{\tau}}$$

$$\alpha_3 = \frac{di_3(t)}{dt}\bigg|_{t=0} = \frac{-V_{CC}-E}{L} - \frac{I_3 R}{L}$$

$$\Delta i_3 = \alpha_3 \cdot T_{off2} = \left(\frac{-V_{CC}-E}{L} - \frac{I_3 R}{L}\right) \cdot T_{off2}$$

Thus, even in the case of very low revolutions, such as in the beginning of the start or in the case of a start failure, if we take into account the very low or practically null induced voltage E of the BLDC motor 10, and the busbar voltage $V_{cc}$ much higher than the voltage drop in the resistances R, due to the current $I_1$ circulating int the BLDC motor 10, the increment in the current variation in the first step $\Delta i_i$ can be compensated by the decrement in the current variation in the third step $\Delta i_3$, provided that the second protecting time $T_{off2}$ is equal to the first time period $T_{on}$. Thus, taking into account the worst case when the current is already above the first maximum current limit $I_{max1}$, wherein the first time period $T_{on}$ is equal to the sampling period $T_s$, the second protecting time $T_{off2}$ must be adjusted in order to be equal to the sampling period $T_s$. Thus, it is possible to guarantee that, even in such conditions, the current variation $\Delta i$, resulting from three steps $\Delta i1$, $\Delta i2$ and $\Delta i3$, is less than zero and it is possible to prevent the overcurrent, such as shown by the equations below:

$$\Delta i = \Delta i_1 + \Delta i_2 + \Delta i_3$$

$$\Delta i = \left(\frac{V_{CC}-I_1 R}{L}\right) \cdot T_{On} - \frac{I_2 R}{L} \cdot T_{Off1} + \left(\frac{-V_{CC}-I_3 R}{L}\right) \cdot T_{Off2}$$

$$\Delta i = \frac{V_{CC}}{L} \cdot (T_1 - T_2) - \frac{I_2 R \cdot T_{pwm}}{L}$$

$$\Delta i = -\frac{I_2 R \cdot T_{pwm}}{L}$$

In the development above, the portions $I_1 R/L \cdot T_{On}$, $I_2 R/L \cdot T_{Off1}$ and $I_2 R/L \cdot T_{Off2}$, which correspond to the natural answer of the RL circuit, were simplified taking as a base the higher current among $I_1$, $I_2$ and $I_3$, in other words $I_2$, and grouping the time portions $t_{On}$, $T_{off1}$ and $T_{off2}$, totaling the period of pulse width modulation $T_{pwm}$.

According to FIG. 9, the first maximum error $\Delta I_{max1}$ in the current limitation, due to the sign sampling carried out by the one-level modified and discrete fixed-time or fixed-frequency hysteresis current controller, can be obtained taking into account the equating of the first step for a first time period $T_{on}$ equal to a sampling period $T_s$, and nulled induced voltage E, according to the equation below:

$$\Delta I_{max1} = \left(\frac{V_{CC}}{L} - \frac{I_{max1} R}{L}\right) \cdot T_S \approx \frac{V_{CC}}{L} \cdot T_S$$

Thus, the first maximum current limit $I_{max1}$ must be lower than the maximum current allowed $I_{desmag}$ minus the first maximum error $\Delta I_{max1}$.

However, such first protecting level does not impede that, in case of occurring a starting failure with reversion of the rotation direction, typical of reciprocating compressors, the current does not continue increasing even after the opening of the first switch with the first protecting level. In this case, if we take into account the induced voltage E of the BLDC motor 10 as negative, which we will rename it as $E_{rev}$ due to the reversion of rotation direction, the BLDC motor current $I_m$ can increase, instead of diminishing, during a switching period. This happens whenever the reversed induced voltage $E_{rev}$ of the BLDC motor 10 is higher than the voltage drop in the resistances R of the BLDC motor 10, such as shown by the equations below:

$$\Delta i = \Delta i_1 \mid \Delta i_2 \mid \Delta i_3$$

$$\Delta i = \left(\frac{V_{CC} \mid E_{rev} \: I_3 R}{L}\right) \cdot T_{On} + \frac{E_{rev} \: I_2 R}{L} \cdot T_{Off1} + \left(\frac{E_{rev} \: V_{CC} \: I_3 R}{L}\right) \cdot T_{Off2}$$

$$\Delta i = \frac{V_{CC}}{L}(T_3 - T_3) + \frac{R_{rev}}{L} \cdot T_{pwm} - \frac{I_3 R}{L} \cdot T_{pwm}$$

$$\Delta i = \frac{(E_{rev} - I_3 R)}{L} \cdot T_{pwm}$$

In the development above, the same simplifying procedure was applied to the portions relating to the natural answer of the circuit RL and the portions relating to the reverse induced voltage $E_{rev}$, where the portions of time $t_{On}$, $T_{off1}$ and $T_{off2}$ are grouped, totaling the pulse width modulation period $T_{pwm}$.

Figure 10:
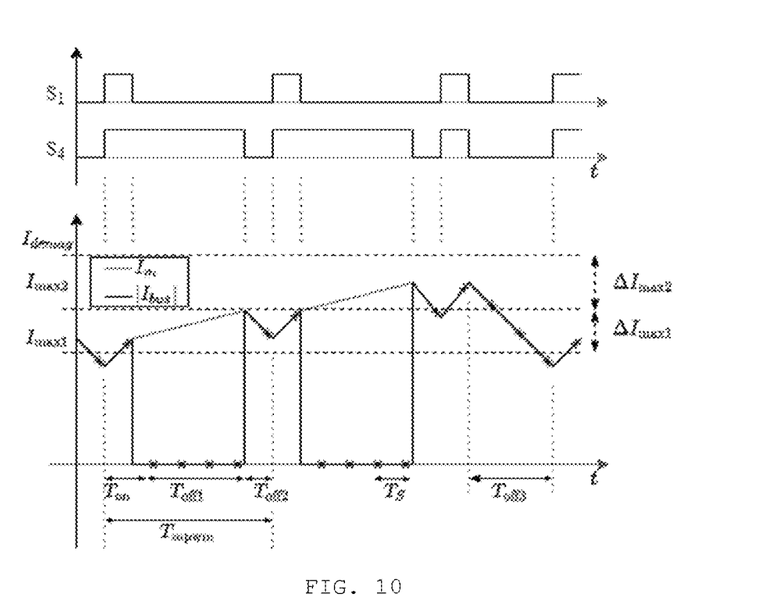
FIG. 10 depicts the result of applying protection of the current by two-levels modified hysteresis current controller according to the present invention.

Thus, the present invention also proposes a second protecting level which defines a second maximum current limit $I_{max2}$, said limit, when reached by the current of the BLDC motor $I_m$, measured in a measuring instant X, opens two switches during a third protecting time $T_{off3}$, as exemplified in FIG. 10, wherein the switches $S_1$ e $S_4$ were open. Still according to FIG. 10, the motor current $I_m$ is forced to pass in the opposite direction by the busbar, applying a negative voltage on the BLDC motor 10 and forcing a more effective reduction of such current.

Therefore, the starting method with two-levels modified and discrete fixed-time or fixed-frequency hysteresis current controller, according to the present invention, as can be seen in FIG. 10, works in the following way: in a first protecting level, related to a first maximum current limit $I_{max1}$, the switch $S_1$ is open during a first protecting time $T_{off1}$. In order to assure an effective current protection, the switches $S_1$ and $S_4$ are open during a second protecting time $T_{off2}$ after the first protecting time $T_{off1}$. Then, there is a second protecting level, related to a second maximum current limit $I_{max2}$, where the switches $S_1$ and $S_4$ are open for a third protecting time $T_{off3}$, and the BLDC motor current $i_m$ is forced to pass by the busbar, being reduced faster and assuring the reliability of the BLDC motor 10.

It Is worth to highlight that the value of the second maximum current limit $I_{max2}$ must take into account the second maximum error $\Delta I_{max2}$, which can occur due to the increase of the current on account of the reversion of the rotation direction. In this case, the second maximum error $\Delta I_{max2}$ depends on the reverse induced voltage $E_{rev}$ of the BLDC motor 10 and may be set by the equation below:

$$\Delta I_{max2} = \frac{E_{rev} - I_{demag} R}{L} \cdot T_{pwm}$$

Thus, the value of the second maximum current limit $I_{max2}$ must be lower than the maximum current allowed $I_{desmag}$ and must be set taking into account the second maximum error $\Delta I_{max2}$.

Additionally, with the addition of the second maximum current limit $I_{max2}$, the first maximum current limit $I_{max1}$ needs to be redefined, so that the first current limit $I_{max1}$ is lower than the second maximum current limit $I_{max2}$ minus the first maximum error $\Delta I_{max1}$.

In addition, the value of the first maximum current limit $I_{max1}$ must be set for the control of the motor current $I_m$, under normal operating conditions and, besides, it must guarantee the second maximum current limit $I_{max2}$ is not surpassed in case of a successful start. Yet the value of the second maximum current limit $I_{max2}$ must be set for the protection against the maximum current allowed $I_{desmag}$, so that it only acts in case of a starting failure.

The duration of the third protecting time can be set in function of the second maximum error $\Delta I_{max2}$, according to the equation below.

$$T_{off3} > \frac{\Delta I_{max2} \cdot L}{(V_{cc} - E_{rev}) + I_{demag} \cdot R}$$

In the case of the fixed-time hysteresis controller, the duration of the third protecting time $T_{off3}$ can be set by the lower modified period of the pulse width modulation $T_{mpwm}$, which would be equal to the first protecting time $T_{off1}$, the second protecting time $T_{off2}$ and the sampling time $T_s$, as the lower time turned on $T_{on}$ is equal to the sampling time $T_s$.

Alternatively, in the case of the fixed-frequency hysteresis controller, the duration of the third protecting time $T_{off3}$ can be simply set by the modified period $T_{mpwv}$.

Finally, the third protecting time $T_{off3}$ can be replaced in such a way that the start is aborted when the motor current $I_m$ surpasses the second current limit $I_{max2}$, as such intensity of the current would be an indication of the revolution of the BLDC motor 10 in the opposite direction and an evidence of starting failure.

Another challenge related to the use of only one current sensor 20 in the busbar would be measuring the higher current when the three phases of the BLDC motor 10 are conducting, such as, for example, in the transitory just after a change in electrical position or in a failure of the sensing of the electric position, such as it happens in a starting failure with inversion of the rotation direction of the BLDC motor 10.

Figure 11A:
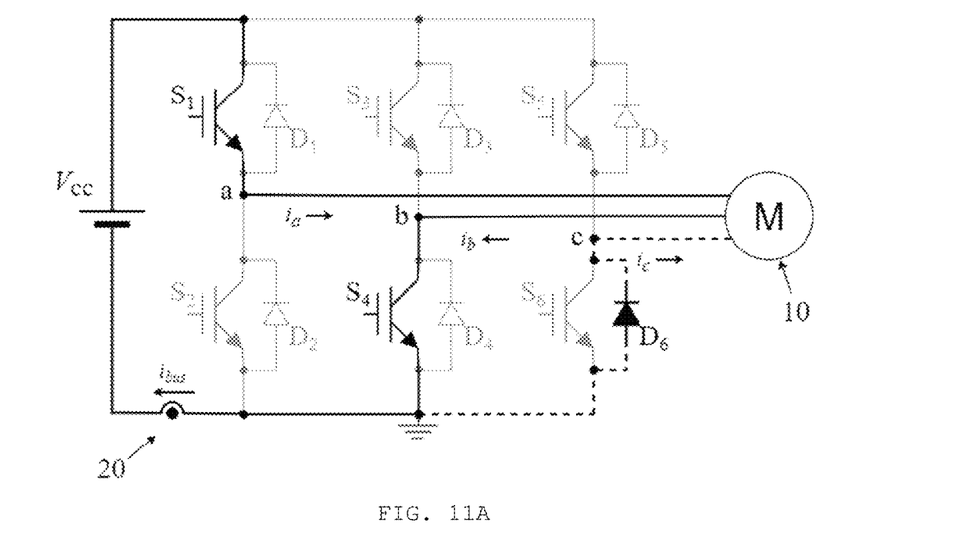
FIGS. 11A and 11B depict the relationships between the phase currents of the motor and the busbar current when the three phases are conducting according to the present invention.

FIG. 11A represents a condition wherein the switches $S_1$ and $S_4$ are turned on, the current enters by phase A and leaves by phase B, an undesired current circulates in phase C. Such undesired current in phase C can be transitory and due to a change in electric position or may have been generated at a starting failure due to reversion of the rotation direction.

Referring again to FIG. 11A, the current $i_{bus}$, that passes through the current sensor 20 of the busbar, is the one similar to current $i_a$ in phase A. However, there still exists a current $i_c$ in phase C, and the current $i_b$ in phase B is characterized by the sum of the currents on the other two phases:

$$i_b = i_a + i_c$$

wherein $i_a > 0$ and $i_c > 0$, so $i_b > 0$

Figure 11B:
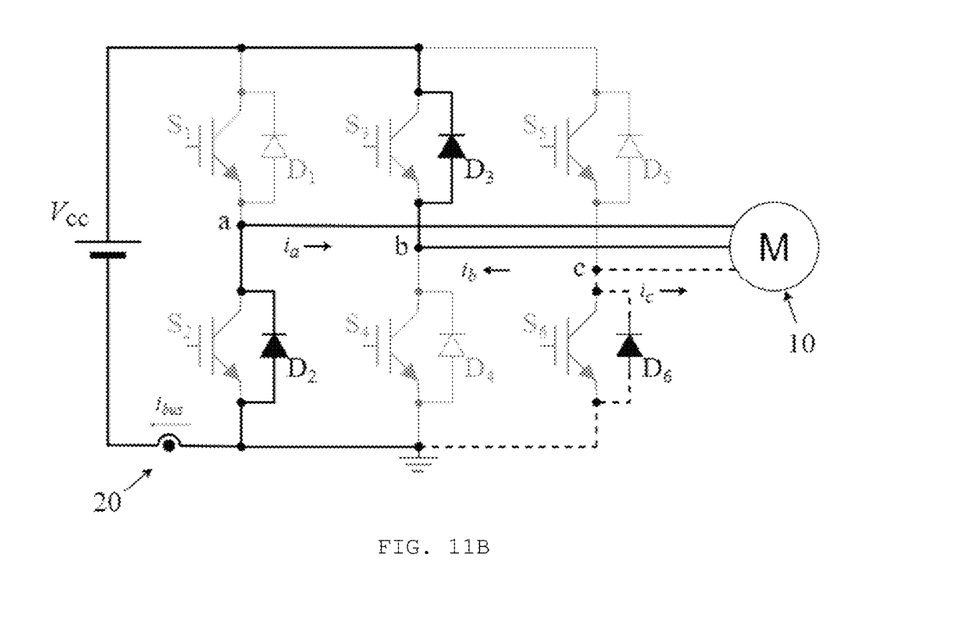

In this sense, in order to manage to carry out the monitoring of the biggest current circulating in the BLDC motor 10, the present invention proposes taking advantage of the opening of the two switches in the end of the switching period, during the second protecting time $T_{off2}$. In this case, during the time when the switches are open, the biggest current circulating in such phases passes through the current sensor 20 of the busbar. In this case, $i_b=i_a+i_c$ such as is illustrated in FIG. 11B.

Finally, the second protecting time $T_{off2}$ can be disabled as soon as a successful start is identified. A successful start may be identified when the BLDC motor 10 manages to make a complete turn or when the speed of the BLDC motor 10 reaches a minimum speed considered safe, such as ¼ of the nominal speed of the motor.

The disability of the second protecting time $T_{off2}$ can be done in a gradual way, gradually reducing its actuating time at each mechanical turn until its complete extinction. The gradual extinction of the second protecting time may be, for example, conducted in approximately one second.

Besides the embodiments previously shown, the same inventive concept shall be applied to other alternatives or possibilities of using the invention.

Though the present invention has been described in relation to certain preferred embodiments, it should be understood that similar challenges are found when 3 current sensors are used associated in series to the lower switches, instead of only one current sensor in the inverter busbar, and they can be solved with the present invention.

The invention claimed is:

1. A starting method with two-levels discrete fixed-time or fixed frequency hysteresis current control, under high load conditions, of a BLDC motor (10) with trapezoidal shaped induced voltages, the BLDC motor (10) being driven by an inverter bridge (30) with only one current sensor (20) positioned in the busbar, controlled by means of a processing unit associated to an analog-digital converter, comprising:
   driving the BLDC motor (10) by a six-step driving technique, wherein only two phases are driven at a certain electric position;
   applying, by means of a closed mesh of current control, a current in the BLDC motor (10) of maximum intensity in order to generate a maximum torque in said BLDC motor (10);
   applying the unipolar switching pattern of an ON_PWM type, wherein each switch is driven during 120° electrical in the following way: each switch is maintained switched on continuously during a first 60° electrical and is modulated by pulse width modulation during a final 60° electrical;
   wherein the method further comprises:
   controlling, by means of the two-levels discrete fixed-time or fixed frequency hysteresis current control, an intensity of the BLDC motor current ($I_m$),
   wherein a first protecting level comprises:
   turning off a first switch, said first switch belonging to a portion of the inverter bridge associated with the two phases driven at a certain electric position, during a first protecting time ($T_{off1}$), when the BLDC motor current ($I_m$), measured in a measuring instant (X), surpasses a first maximum current limit ($I_{max1}$); and
   keeping the first switch turned off and turning off a second switch, said second switch belonging to the portion of the inverter bridge associated with the two phases driven at a certain electric position, during a second protecting time ($T_{off2}$), in the end of the first protecting time ($T_{off1}$);
   wherein a second protecting level comprises:
   turning off the first switch and the second switch, during a third protecting time ($T_{off3}$), when the BLDC motor current ($I_m$), measured in a measuring instant (X), surpasses a second maximum current limit ($I_{max2}$),
   wherein the first maximum current limit ($I_{max1}$) is lower than the second maximum current limit ($I_{max2}$); and
   wherein the second protecting level actuates after the actuation of first protecting level.

2. The method, according to the claim 1, characterized in that the second maximum current limit ($I_{max2}$) is lower than a maximum current allowed ($I_{desmag}$).

3. The method, according to claim 1, characterized in that the second maximum current limit ($I_{max2}$) is set by subtracting a maximum current allowed ($I_{desmag}$) by a second maximum error ($\Delta I_{max2}$), and the first maximum current limit ($I_{max1}$) is set by subtracting the second maximum current limit ($I_{max2}$) by a first maximum error ($\Delta I_{max1}$).

4. The method, according to claim 1, characterized in that a difference between a value of the first maximum current limit ($I_{max1}$) and a value of the second maximum current limit ($I_{max2}$) is higher than a value of a first maximum error ($\Delta I_{max1}$).

5. The method, according to claim 1, characterized in that a difference between a value of the second maximum current limit ($I_{max2}$) and a value of a maximum current allowed ($I_{desmag}$) is higher than a value of a second maximum error ($\Delta_{Imax2}$).

6. The method, according to claim 1, characterized in that the first protecting time ($T_{off1}$) guarantees that a reduction of the BLDC motor current ($I_m$) is higher than a first maximum error ($\Delta I_{max1}$) in the case of a successful start.

7. The method, according to claim 1, characterized in that the second protecting time ($T_{off2}$) must be lower than or equal to a sampling period ($T_s$).

8. The method, according to claim 7, characterized in that the second protecting time ($T_{off2}$) is gradually extinct when the BLDC motor (10) reaches ¼ of the nominal speed or carries out a complete mechanical turn.

9. The method, according to claim 8, characterized in that the gradual extinction of the second protecting time ($T_{off2}$) must be done in approximately one second.

10. The method, according to claim 1, characterized in that the third protecting time ($T_{off3}$) guarantees that a reduction of the BLDC motor current ($I_m$) is bigger than a value of the second maximum error ($\Delta I_{max2}$) even in the case of a starting failure.

11. The method, according to claim 1, characterized in that a third protecting time ($T_{off3}$) is replaceable when:
   the two switches are switched on again when the motor current ($I_m$), measured in a measuring instant (X), is lower than the first maximum current limit ($I_{max1}$).

12. The method, according to claim 1, characterized in that the third protecting time ($T_{off3}$) is replaceable as follows:
   the starting is aborted when the motor current ($I_m$) surpasses a second maximum current limit ($I_{max2}$).

13. The method, according to claim 1, characterized in that the first protecting time ($T_{off1}$) is adjustable as a function of the speed of the motor.

14. The method, according to claim 1, characterized in that the step of turning off a first switch, during the first protecting time ($T_{off1}$), when the BLDC motor current ($I_m$), measured in a measuring instant (X), surpasses a first maximum current limit ($I_{max1}$) is replaced by:
   turning off a first switch when the BLDC motor current ($I_m$), measured in a measuring instant (X), surpasses a first maximum current limit ($I_{max1}$), and only switching the first switch on again in the beginning of a next modified period of the pulse width modulation ($T_{MPWM}$).

15. The method, according to claim 1, characterized in that the first switch to be turned off is the switch associated to the phase kept driven after a change of electrical position.

16. The method, according to claim 1, wherein the method comprises utilizing opening of the two switches, at an end of the second protecting time $T_{off2}$, to carry out monitoring of a largest current circulating in the BLDC motor 10.

17. The method, according to claim 1, wherein the method is performed to protect against exceeding the first maximum current limit or the second maximum current limit.

* * * * *